United States Patent
Lecomte et al.

(10) Patent No.: US 8,695,029 B2
(45) Date of Patent: Apr. 8, 2014

(54) SYSTEM AND METHOD OF ADAPTIVE AND PROGRESSIVE DESCRAMBLING OF STREAMING VIDEO

(75) Inventors: Daniel Lecomte, Paris (FR); Daniela Parayre-Mitzova, Paris (FR); Sébastien Georges, Paris (FR)

(73) Assignee: Nagra France (FR)

( * ) Notice: Subject to any disclaimer, the term of this patent is extended or adjusted under 35 U.S.C. 154(b) by 1613 days.

(21) Appl. No.: 11/091,217

(22) Filed: Mar. 28, 2005

(65) Prior Publication Data
US 2005/0193409 A1 Sep. 1, 2005

Related U.S. Application Data

(63) Continuation of application No. PCT/FR03/02915, filed on Oct. 3, 2003.

(30) Foreign Application Priority Data

Oct. 3, 2002 (FR) .................................... 02 12271

(51) Int. Cl.
*H04N 7/167* (2011.01)
*H04N 7/16* (2011.01)

(52) U.S. Cl.
USPC ............................................. 725/31; 725/25

(58) Field of Classification Search
USPC ....................... 725/25, 31; 380/211
See application file for complete search history.

(56) References Cited

U.S. PATENT DOCUMENTS

| 5,953,506 A * | 9/1999 | Kalra et al. ................... 709/231 |
| 6,389,071 B1 * | 5/2002 | Wilson ......................... 375/240 |
| 6,459,794 B1 * | 10/2002 | de Vito et al. ................. 380/210 |
| 2002/0018565 A1 | 2/2002 | Luttrell et al. |
| 2002/0116705 A1 * | 8/2002 | Perlman et al. ................. 725/31 |

FOREIGN PATENT DOCUMENTS

| EP | 1 033 880 A2 | 9/2000 |
| WO | WO 9842098 * | 9/1998 .............. H04L 9/00 |

OTHER PUBLICATIONS

Thomas Kunkelmann et al., *Video Encryption Based on Data Partitioning and Scalable Coding—A Comparison*, Interactive Distributed Multimedia Systems and Telecommunication Services, Sep. 8, 1998, pp. 95-106.

* cited by examiner

*Primary Examiner* — Nasser Goodarzi
*Assistant Examiner* — Hyun Hong
(74) *Attorney, Agent, or Firm* — DLA Piper LLP (US)

(57) ABSTRACT

A method of distributing digital video sequences in the form of a stream including sequences of data containing digital images, including a modification stage of an original stream by modifying at least a part of the sequences, the modification producing a modified stream of the same nominal format as the original stream, transmitting the modified stream, and a reconstruction stage implemented with a decoder, wherein the reconstruction is adaptive and progressive in function of information coming from a digital profile of the recipient.

19 Claims, 1 Drawing Sheet

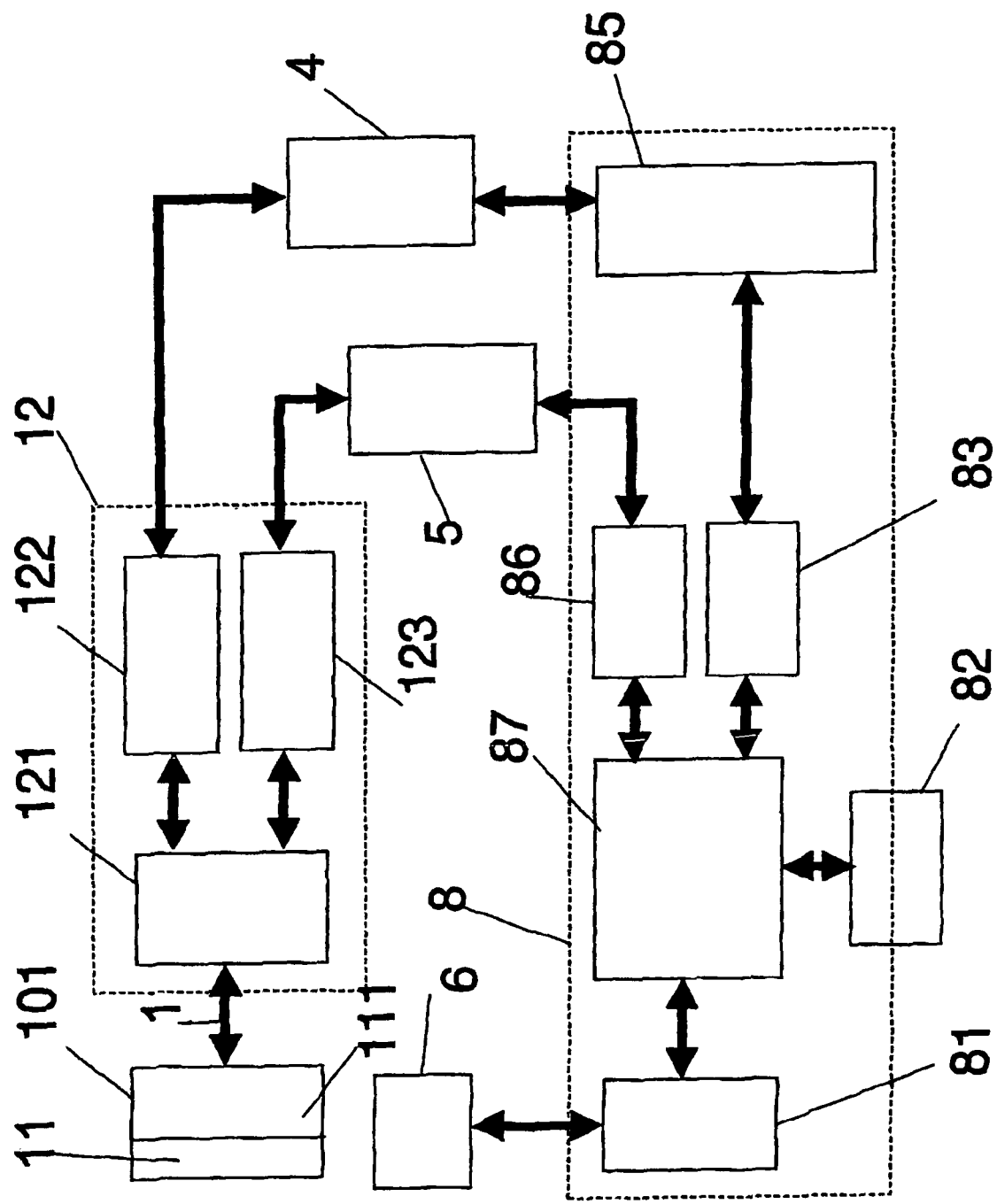

SYSTEM AND METHOD OF ADAPTIVE AND PROGRESSIVE DESCRAMBLING OF STREAMING VIDEO

RELATED APPLICATION

This is a continuation of International Application No. PCT/FR2003/002915, with an international filing date of Oct. 3, 2003 (WO 2004/032478 A2, published Apr. 15, 2004), which is based on French Patent Application No. 02/12271, filed Oct. 3, 2002.

FIELD OF THE INVENTION

This invention relates to the domain of digital video data processing, more particularly to a system for scrambling and recomposing digital video content.

BACKGROUND

WO 01/97520 discloses a device for secure broadcasting, conditional access, controlled visualization, private copy, and storage at recipients of protected streaming video. That disclosure concerns a video interface arrangement connecting at least one display device to one video source, in essence consisting, on the one hand of a programmed processing unit adapted to manage, more specifically the decoding and descrambling of any type of streaming video, according to a predefined descrambling program for the purpose of decoding the video sequence, of displaying it in real time or delayed, storing it, recording it and/or sending it through the telecommunication network, and on the other hand, at least one screen interface, at least one storage unit, one local network interface, one user interface and one control interface, the interfaces being connected and piloted by a control unit, integrated at the recipient.

SUMMARY OF THE INVENTION

This invention relates to a method of distributing digital video sequences in the form of a stream including sequences of data containing digital images, including a modification step of an original stream by modifying at least a part of the sequences, the modification producing a modified stream of the same nominal format as the original stream, transmitting the modified stream, and a reconstruction step implemented with a decoder, wherein the reconstruction is adaptive and progressive in function of information coming from a digital profile of the recipient.

This invention also relates to a system for distributing digital video sequences including a server containing means of broadcasting a modified stream according to the distribution method, and a plurality of devices equipped with a descrambling circuit, wherein the server contains in addition a recorder for the digital profile of the recipient and an analyzer for the profile of each recipient of the modified stream, the recorder commanding the nature of the complementary information transmitted to each of the analyzed recipients.

BRIEF DESCRIPTION OF THE DRAWING

The invention will be better understood with the help of the description, given here after strictly for explanatory purposes, of one way of implementing the invention, with reference to the attached FIGURE: the Drawing illustrates a particular way of implementing the client-server system conforming to the invention.

DETAILED DESCRIPTION

This invention relates to a device capable of transmitting in a secure manner a set of films of high visual quality to a television screen and/or to be recorded on the hard disk of a device connecting the telecommunication network with the visualization screen such as a television or the monitor of a personal computer, while preserving the audiovisual quality, but avoiding fraudulent use such as the possibility of making pirated copies of films or of the audiovisual programs recorded on the hard disk of the decoding device.

The invention also relates to a method for distributing digital video sequences according to a nominal stream format comprising a succession of frames, each containing at least one digital block regrouping a certain number of coefficients corresponding to simple video elements digitally coded according to a method defined inside the subject stream and used by all video decoders capable of displaying it to decode it correctly. This method comprises:

a preparatory stage comprising modifying at least one of the coefficients,
a transmission stage
  of a main stream conforming to the nominal format, comprising planes containing the blocks modified during the preparatory stage and
  by a way separate from the main stream, of complementary digital information allowing to reconstitute the original stream starting from a calculation, on the destination equipment, in function of the main stream and the complementary information, wherein the complementary information is defined as a set of data (for instance, coefficients describing the original digital stream or extracted from the original stream) and functions (for instance, substitution or permutation functions). A function is defined as containing at least one instruction establishing the relationship between data and operators. The complementary information describes the operations to be performed to recuperate the original stream starting from the modified stream.

In this invention the term "scrambling" means modification of a digital streaming video by appropriate methods so that the stream remains in conformance with the standard or to the standard according to which it was encoded digitally, while making it suitable to be visualized by a reader (or viewer or displayer or player), but altered from the point of view of human visual perception.

The term "descrambling" means the process of restoring the initial stream by appropriate methods, the restored streaming video after descrambling being substantially identical to the initial original streaming video. The restoration of the original stream is done on the destination equipment starting from the modified main stream already present or sent in real time to the destination equipment and of the complementary information sent in real time containing data and functions executed by means of digital routines (set of instructions).

The term "profile" means a digital file containing descriptors and specific user information, for instance, cultural preferences and social and cultural characteristics, user's habits such as the periodicity of video equipment use, the average duration of visualization of a scrambled film, the visualization frequency of a scrambled sequence, or any other behavioral characteristics related to the exploitation of films and video sequences. A digital file or a digital table that can be exploited by information system means formalizes this profile.

Many scrambling systems have an immediate effect, whether the initial stream is totally scrambled, or the initial stream is not scrambled at all, and the same applies to the descrambling systems for the video content. With this type of rigid systems it is difficult to satisfy the requirements of multi-user, multi-application and multi-services client-server systems, in other words, adapting the services in function of the different users and their rights.

This invention remedies the inconveniences of the prior art by providing an adaptive and progressive descrambling system for the visualized content in function of the profile and rights of the viewer.

In the invention, an adaptive and progressive descrambling is applied of the visualized content in function of the profile and rights of each viewer. The server sends only the parts of the complementary information, that has a structure characterized by a "granular scalability" to deliver to the viewer a content more or less scrambled in function of certain criteria, profiles and rights. The term "scalability" is defined starting from the English word "scalability" that characterizes an encoder capable of encoding or a decoder capable of decoding an ordered set of binary data in such a manner as to produce or reconstitute a multi-layer sequence. Granularity is defined as the quantity of information susceptible of being transmitted by layer of a system characterized by any scalability, the system is therefore also granular. The granularity is proportional to the degree of scrambling. The streaming video is completely scrambled, one time for all viewers. Next, the server sends all or part of the complementary information in such a manner that the stream appears more or less scrambled to the viewer. The content of the complementary information sent and the content visualized on the visualization screen of the viewer are a function of each viewer and the server controls and performs the transmission in real time at the time of the visualization by each viewer.

In one aspect, the invention relates to a method of distributing digital video sequences in the form of a stream comprising data sequences containing digital images, the method comprising a modification stage of the original stream by modifying at least a portion of the data sequences, the modification producing a modified stream of the same nominal format as the original stream, the method comprising a transmission stage of the modified stream and a reconstruction stage by means of a decoder, characterized by the reconstruction being adaptive and progressive in function of information coming from a digital profile of the destination viewer.

The modification produces a main modified stream and a complementary information allowing the reconstruction of the original stream by a descrambler, the method comprising a transmission stage of the modified stream, and comprising in addition a transmission stage to the destination equipment of a sub-set of the complementary modification information, the sub-set being determined in function of information coming from the digital profile of the recipient.

According to one aspect, the modified main stream is recorded on the destination equipment prior to the transmission of the complementary information to the destination equipment. According to another aspect, the modified main stream and the complementary information are transmitted together in real time. Advantageously, determination of the sub-set is performed by a granular scalability method; the quantity of information contained in the sub-set corresponds to a scalability level determined in function of the viewer's profile.

According to yet another aspect, the type of information contained in the sub-set corresponds with a level of scalability determined in function of the recipient's profile.

According to a particular aspect of the method, the complementary modification information contains at least a digital routine capable of executing a function. Preferably, the functions are personalized for each recipient in function of the connecting session. Advantageously, the complementary information is subdivided in at least two sub-parts.

According to still another aspect, different media can distribute the sub-parts of the complementary information. According to another aspect, the same media can distribute the sub-parts of the complementary information.

According to one method of implementation, the complementary information is transmitted on a physical vector. According to another aspect, the complementary information is transmitted on line.

Advantageously, the digital images are the images I, or P, or B, or planes S. According to a particular method of implementation, the digital images use wavelet-based technology.

According to another aspect, the format of the nominal video stream is defined by the standard MPEG-1 or MPEG-2 or MPEG-4.

Preferably, at least a part of the profile is stored on the destination equipment.

Advantageously, the type of information contained in the sub-set is updated based on the behavior of the recipient during the connection with the server, or in function of user habits, or in function of data communicated by a third party.

According to one aspect, the method comprises a prior stage of analog/digital conversion in a structured format, the method being applied to an analog video signal.

The invention also relates to a system for distributing video sequences comprising a server containing means of broadcasting a modified stream conforming to the method described previously and a plurality of devices equipped with a descrambling circuit, characterized by the fact that the server contains in addition a means of recording the digital profile of each recipient and a means of analyzing the profile of each of the recipients of a modified stream, the means commanding the nature of the complementary information transmitted to each of the analyzed recipients.

According to one aspect, the level (quality, quantity, type) of complementary information is determined for each recipient in function of the state of its profile at the time of visualization of the main stream.

A digital streaming video comprises sequences of images, regrouped in groups of images ("Groups of Pictures") (GOP's). An image can be of type I (Intra), P (Predicted), B (Bi-directional). A plane S is a plane containing a static object, that is a fixed image describing the background of the image or a coded plane using a prediction based on global motion compensation (GMC) starting from a prior reference plane. The I images are the reference images, they are completely coded and are therefore of large size and contain no information about the motion. The P planes are predicted planes starting from prior planes, whether I and/or P by motion vectors in only one direction, called "forward". The B planes are called bi-directional, they are linked to planes I and/or P that are preceding or following them by motion vectors in the two temporal directions (forward and back or "backward"). The motion vectors represent bi-dimensional vectors used for the compensation of the motions, which find the difference of the coordinates between a portion of the current image and a portion of the reference image. The digital images can also be obtained with the help of wavelet-based technology (for instance, the fixed images in the MPEG-4 standard), the wavelet concept being an iterative scheme, in other words, the never ending repetition of the same operation on continuously smaller scale, a principle which is well characterized by granular scalability.

The definition of the quantity of information contained in the sub-set is the number of data and/or functions belonging to the complementary information sent to the recipient during the connection.

The type of information contained in the sub-set, corresponds to a scalability level determined in function of the recipient's profile. The type is defined as the nature of the data and/or functions belonging to the complementary information sent to the recipient during the connection. For instance, the type of data is related to the habits of the recipient (hour of connection, duration of the connection, regularity of connection and payments), his environment (lives in a large city, the current weather) and his characteristics (age, sex, religion, community).

The complementary information is composed at least of functions personalized for each recipient in relationship to the connection session. A session is defined as starting from the connection time, the duration, the type of the first visualized stream and the connected elements (recipients, servers).

The complementary information is subdivided in at least two sub-parts, each of the sub-parts can be distributed by different media, or by the same media. For instance, in the case of distribution of the complementary information through several media, a more complex management of the rights of the recipients can be ensured.

Our solution can be applied, as an example and in a non-limiting manner, to streams of the type MPEG-2. A MPEG-2 stream comprises sequences, each sequence being divided into groups of images, themselves comprising images I, P, B. One image containing a certain number of sub-structures called "slices". One slice is a succession of macro blocks. A macro block is a collection of blocks (4 of luminance, and 2 of chrominance, for instance, for the format 4:2:0), representing a large square 64*64 pixels on the decoded image. One block contains the information corresponding to a square of 8*8 pixels on the coded image in one of the components of the image (luminance Y, or chrominance Cb or Cr).

During the encoding of a stream in MPEG-2 format, the image (whether a reference image or obtained by using a motion compensation) is decomposed according to its three components (Y, Cb and Cr). Each of the three sub-images thus obtained is then divided in blocks (graded in slices, macro blocks, images, etc.). These blocks undergo several treatments before being inserted in the MPEG-2 stream. First, they go through the frequential domain by applying a function to them called DCT (Discrete Cosine Transform) which is a classic algorithm for transposing information from the spatial domain to the frequential domain. Following this transformation, the coefficients located above left of the newly obtained block correspond to the weakest frequencies in the two dimensions, while those obtained below right, to the highest frequencies.

A following treatment comprises quantifying these coefficients so that the information corresponding to the very high frequencies, for which the human eye is little sensitive, is reduced.

The coefficient located above and to the left of the matrix obtained after quantification, called DC coefficient, that corresponds with the continuous component of the block. In other words, the average value of the block pixels, is then stored in the MPEG-2 stream by optimizing the binary space it occupies thanks to a differential treatment and a variable length coding. When a DC coefficient is decoded, a first value is obtained starting from the data present in a block, and then this value is added to a prediction value in order to find the real value. Each time a DC coefficient is decoded, the prediction value is updated with the value generated in this way. The other coefficients (63 in total) called AC are then placed one following the other (in the form of vectors) in such way that the obtained vector contains the largest possible number of consecutive null values to apply to it a pair level type of coding or "Run level". This type of coding comprises coding the vector in the form of a series of "run-level" pairs, the "run" corresponding to the number of null values that precede the "level" value in the vector. In this way, the more a vector involves successive null values, the more efficient this type of coding is.

The invention can, for example, comprise, but in a non limiting way, modifying for a MPEG-2 stream the value of certain fields, notably the coefficients DC and/or AC and/or of the motion vectors, and this whether for one or several blocks, macro blocks, slice, and also whether for one or all of the colorimetric components Y, Cb, Cr or any of the other elements of the stream structured to obtain a MPEG-2 stream perfectly conform to the standard, but with a degraded visual quality, and to store, in the complementary information, organized in different scalability layers, the necessary information for a decoder to reconstitute parts of the original stream or the integrality of the stream. For instance, we can modify the values of the coefficients DC and AC of the planes I, the DC of the intra blocks in the planes P and the vectors of the motions between the planes I, P and B. When the application of the server decides not to descramble completely the stream to be displayed for a given viewer or when the rights of a viewer are not sufficient for the server to send to the user the integrality of the complementary information, the server can for instance return only the real values of the coefficients AC of planes I and the DC of the Intra blocks in the planes P, but not the rest of the modified information.

The Drawing represents a particular preferred implementation method of the client-server system conforming to aspects of the invention.

The original stream (101) can be directly in digital form (111) or in analog form (11). In the latter case, an encoder (not shown) converts the analog stream (11) in digital format (111). Hereinafter, we will indicate the input digital stream as (1). The MPEG-2 stream that we want to secure (1) passes through an analysis and scrambling system (121) that will generate a main modified stream (122) in MPEG-2 format, identical to the input stream (1) except for certain coefficients having been replaced by values different from the original, and is placed in an output buffer storage (122). The complementary information (123), in any format, contains information related to the elements of the images that have been modified, replaced, substituted or displaced, and their value or location in the original stream.

The stream in MPEG-2 format (122) is then transmitted, via a hertz type, high flow network (4), cable, satellite and the like to the terminal of the viewer (8), and more in particular on his hard disk (85). When the viewer (8) makes a request to view the film present on hard disk (85), there are two possibilities: either the viewer (8) does not have all the rights necessary to view the film, in this case, the MPEG-2 stream (122) generated by the scrambling system (121) present on the hard disk (85) is passed to the synthesis system (87), via a reading buffer storage (83), which does not modify it and transmits it identically to a classic MPEG-2 display reader (81) and its content, visually degraded by the scrambling system (121), is displayed on the visualization screen (6), or the server decides that the viewer (8) possesses the right to view the film, which can be tested by means of a chip card (82) based system, linked to the synthesis system (87). In this case, the synthesis system issues a view request to the server (12) containing the necessary information (123) for the recuperation of the original video (101). The server (12) sends then via the telecommunication networks, of analog or digital telephone line type, DSL (Digital Subscriber Line) or BLR (Boucle Locale Radio), via DAB networks (Digital Audio Broadcasting) or via networks of mobile digital telecommunication (GSM, GPRS, UMTS) (5) the complementary information allowing the reconstitution of the video (123) so that the viewer (8) can store it in a buffer memory (86). The synthesis system (87) proceeds then with the restoration, in the scrambled MPEG-2 stream that it reads in its buffer memory (83), the modified fields of which it knows the positions as well as the original values thanks to the content of the complementary information read in the descrambling buffer memory (86) of the video. The quantity of information contained in the complementary information (123) that is sent to the descrambling system is specific, adaptive and progressive for each viewer and depends of his rights, for instance single or multiple use, the right to make one or more private copies, late or early payment.

The level (quality, quantity, type) of the complementary information is determined in function of each recipient, in function of the status of the user profile at the time of the transmission of the main stream and at least a portion of said profile is stored on receiving equipment. For instance, in the Drawing, a portion of the viewer profile is recorded on the chip card (82) linked to the synthesis system (87), as for instance the connection frequency or the regularity of payments. The rest of the profile can reside on the server, as for instance the kind of video films preferred by the viewer.

Another example is the updating of the recipient's profile, which depends also from the connection time with the server (referring to behavior), namely whether the viewer connects regularly (referring to his habits) or updating in function of the data recuperated from an already existing consumers database on a server and relative to this viewer.

Still another example is that the server transmits all the complementary information to the viewer during the first minutes of the visualization of the film, then, as time passes, transmits less and less complementary information to the viewer so that the main stream is less and less descrambled, given in this way to the viewer the effect that his screen becomes more and more scrambled. This functionality can incite the viewer to purchase the displayed film.

Yet another example is that all or part of the complementary information (123) is transmitted to the viewer on a physical vector such as a memory card or a chip card (82).

The invention claimed is:

1. A method of distributing digital video sequences in the form of a stream comprising sequences of data containing digital images, comprising:
   producing a scrambled modified stream altered from the point of view of human visual perception from the original stream by replacing at least a part of coefficients of the sequences of the original stream by values different from original values, the original stream being in a nominal compressed format other than encrypted, said modified stream being of the same nominal compressed format as the original stream,
   producing complementary information having a granular scalability structure allowing reconstruction of the original stream by a decoder and comprising the original replaced coefficient and a corresponding location in the original stream and at least one function containing at least one instruction, wherein the complementary information describes an operation to be performed to reconstruct the original stream from the modified stream and the original replaced coefficient in the complementary information,
   transmitting the modified stream to a recipient,
   transmitting a subset of the complementary information to the recipient, the subset being determined based on a digital profile of the recipient and is adaptive and progressive in function of the digital profile provided, and
   reconstructing at a recipient side of the video sequences from the modified stream and the complementary information by replacing the modified coefficients from the modified stream by values contained in the complementary information at locations indicated by the complementary information.

2. The method according to claim 1, wherein the main modified stream is recorded on the destination equipment prior to transmission of the complementary information to the destination equipment.

3. The method according to claim 1, wherein the modified main stream and the complementary information are transmitted together in real time.

4. The method according to claim 1, wherein the quantity of information contained in the sub-set corresponds to a scalability level determined in function of the profile of the recipient.

5. The method according to claim 1, wherein the type of information contained in the sub-set corresponds to a scalability level determined in function of the profile of the recipient.

6. The method according to claim 1, wherein the modifying complementary information contains at least one digital routine capable of performing a function.

7. The method according to claim 1, wherein the complementary information is subdivided in at least two sub-parts.

8. The method according to claim 1, wherein all or part of the complementary information is transmitted on a physical vector.

9. The method according to claim 1, wherein the complementary information is transmitted on line.

10. The method according to claim 1, wherein the digital images are images I, or P, or B, or planes S.

11. The method according to claim 1, wherein the digital images use wavelet-based technologies.

12. The method according to claim 1, wherein at least one part of the profile is stored on the destination equipment.

13. The method according to claim 1, wherein the type of information contained in the sub-set is updated in function of the behavior of the recipient during the connection with the server, or in function of user habits or in function of data communicated by a third party.

14. The method according to claim 1, further comprising a preliminary stage of analog/digital conversion in a structured format, the method being applied to an analog video signal.

15. A system for distributing digital video sequences comprising a server containing means of broadcasting a modified stream according to claim 1, and a plurality of devices equipped with a descrambling circuit, wherein the server contains in addition a recorder for the digital profile of the recipient and an analyzer for the profile of each recipient of the modified stream, the recorder commanding a subset of the complementary information transmitted to each of the analyzed recipients.

16. The method according to claim 6, wherein the functions transmitted to each recipient are personalized for each recipient in function of the session.

17. The method according to claim 6, wherein the sub-parts of the complementary information can be distributed by the same media.

18. The method according to claim 7, wherein the sub-parts of the complementary information can be distributed by different media.

19. The system according to claim 15, wherein the subset (quality, quantity, type) of the complementary information is determined for each recipient in function of the status of a profile at the time of the visualization of the video sequences.

* * * * *